(12) United States Patent
Nagamine

(10) Patent No.: US 7,065,040 B2
(45) Date of Patent: Jun. 20, 2006

(54) RING SWITCHING METHOD AND NODE APPARATUS USING THE SAME

(75) Inventor: Kazuaki Nagamine, Kawasaki (JP)

(73) Assignee: Fujitsu Limited, Kawasaki (JP)

( * ) Notice: Subject to any disclaimer, the term of this patent is extended or adjusted under 35 U.S.C. 154(b) by 1032 days.

(21) Appl. No.: 10/095,253

(22) Filed: Mar. 11, 2002

(65) Prior Publication Data

US 2003/0058790 A1 Mar. 27, 2003

(30) Foreign Application Priority Data

Sep. 21, 2001 (JP) ............................. 2001-288471

(51) Int. Cl.
*G01R 31/08* (2006.01)
(52) U.S. Cl. ...................................... 370/223; 370/225
(58) Field of Classification Search ...................... None
See application file for complete search history.

(56) References Cited

U.S. PATENT DOCUMENTS 5,442,620 A * 8/1995 Kremer ....................... 370/224
6,728,205 B1 * 4/2004 Finn et al. .................. 370/217
2001/0019536 A1 * 9/2001 Suzuki ........................ 370/226

* cited by examiner

*Primary Examiner*—Chau Nguyen
*Assistant Examiner*—Tito Pham
(74) *Attorney, Agent, or Firm*—Katten Muchin Rosenman LLP

(57) ABSTRACT

A node apparatus for a ring network arranged in a multi-ring formation includes a routing table that defines relationships between a receiving physical line identifier with port number and a sending physical line identifier with port number for virtual ring bypass routes, the relationships being individually provided for respective transmission lines connected to the node apparatus. A detection unit detects, at a time of detection of a failure, each of the relationships from the routing table to determine a transmission line to which a switching request is sent. The detection unit detects, at a time of relaying, each of the relationships from the routing table to determine a transmission line to which one of a switching request and a switching response is sent. The detection unit detects, at a time of receiving of a switching request, each of the relationships from the routing table to determine a transmission line to which a switching response is sent.

8 Claims, 13 Drawing Sheets

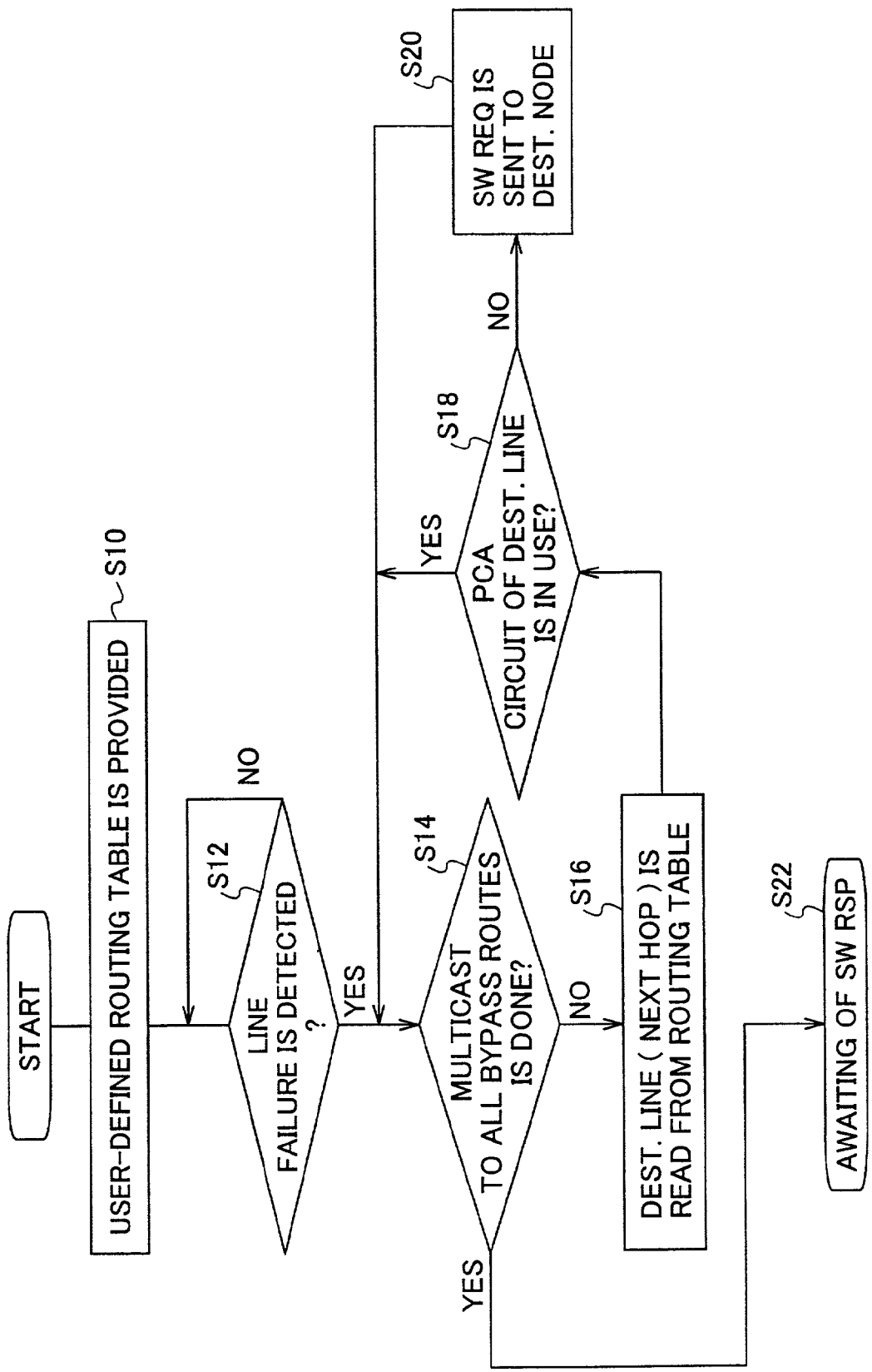

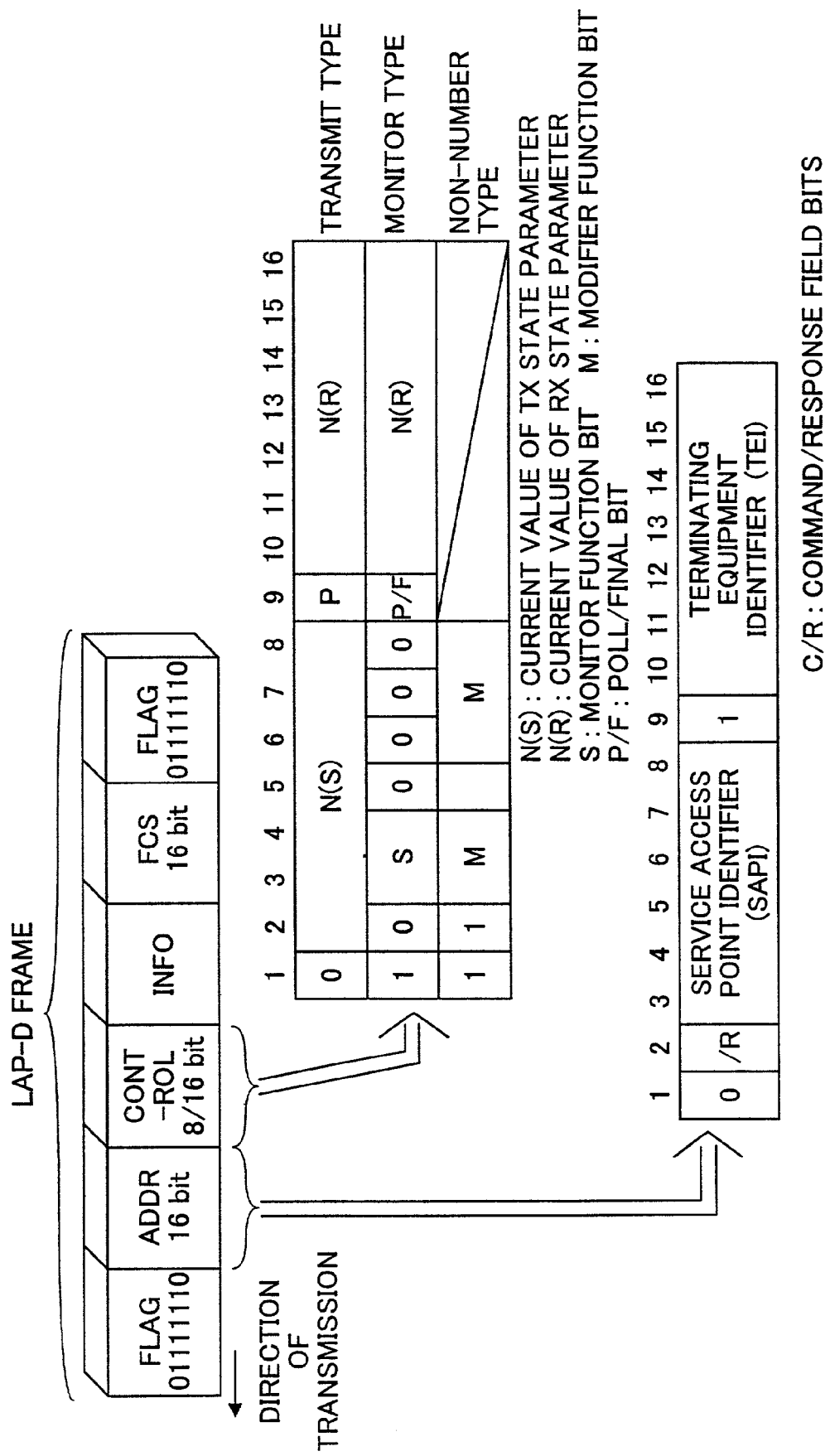

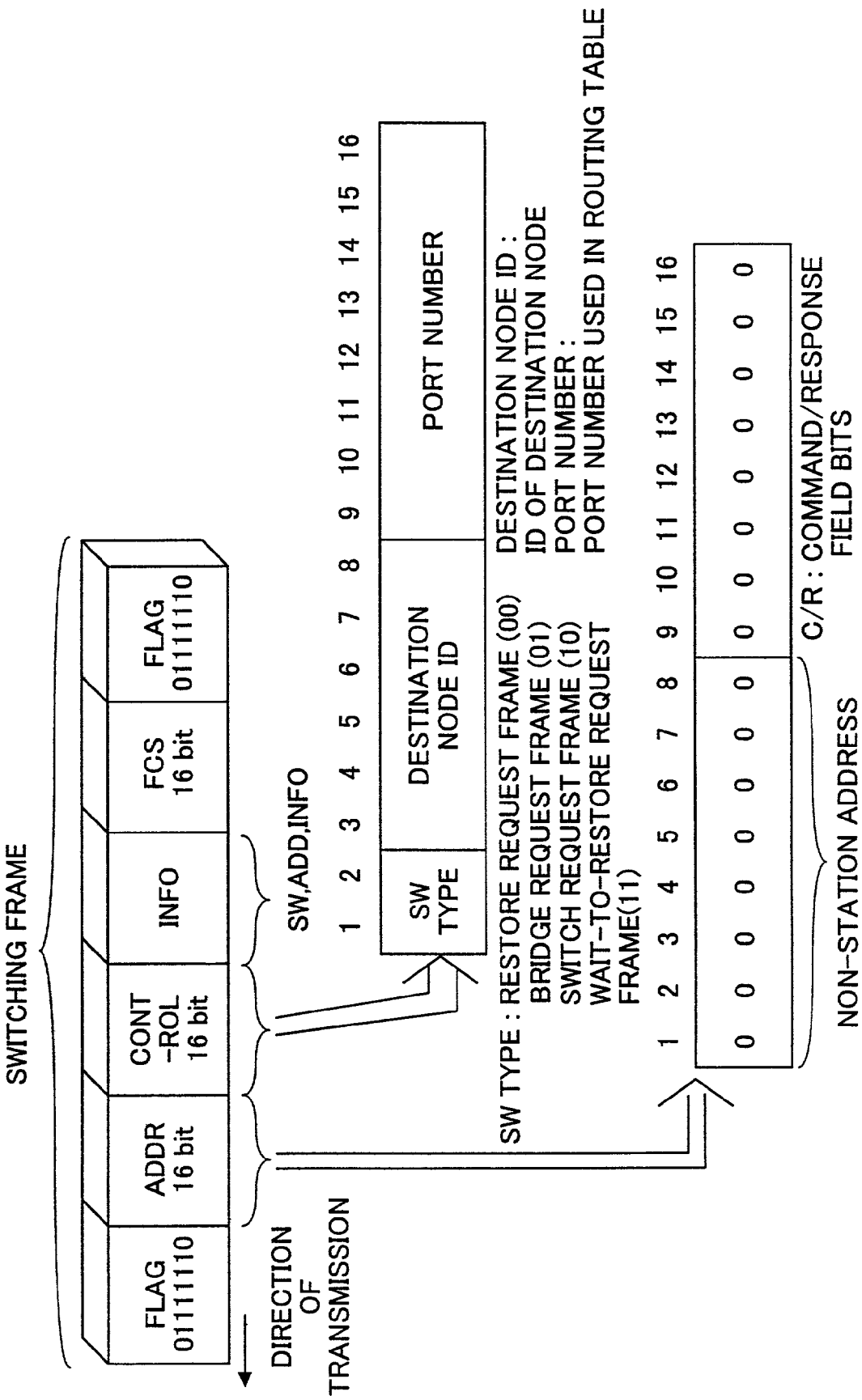

RING SWITCHING METHOD AND NODE APPARATUS USING THE SAME

BACKGROUND OF THE INVENTION

1. Field of the Invention

The present invention relates to a ring switching method that determines a bypass route in a multi-ring network in order to recover the transmission against a failure in the network. Moreover, the present invention relates a node apparatus that performs the ring switching method.

2. Description of the Related Art

Conventionally, when a ring network is constituted by a plurality of SONET (Synchronous Optical Network) devices and a recovery of the transmission over the network against a failure is needed, the BLSR (Bidirectional Line Switched Ring) switch operation is performed in conformity with the GR-1230-CORE of Telcordia Technologies. In this requirement, it is specified that a failure switching request, which is carried by the APS (k1, k2) bytes of the overhead of SONET frame, is notified to a far-end node of the network, and that software switch operation be performed in order to bypass the failure-detected node. Regarding the path with which the transmission is cut off due to the failure, the switching from the working channel to the protection channel is performed through bridge operation at the far-end node. And the switching from the protection channel to the working channel is performed through switch operation at the failure-detected node, in order to avoid the cut-off of the frame transmission.

The above-mentioned conventional method treats the protection channels in a fixed manner when switching the working channel to the protection channel. The bypass route constitutes a closed-loop route within the same ring. In a case of the two-fiber BLSR method, the working channels that amount to 50% of the entire resources and the protection channels that amount to 50% of the entire resources are needed.

An important reason why the BLSR method is demanded for the SONET network is that a bypass route avoiding the transmission through the failure-detected node is taken at the time of detection of a failure, and that the BLSR method is capable of making effective use of the protection channels as the PCA (protective connecting arrangement) circuits during a normal operation, which is different than the UPSR (unidirectional path switched ring) method.

However, the above-mentioned BLSR method treats the protection channels in a fixed manner, and the ratio of the protection channels to the working channels is relatively large. The bypass route that is determined based on the BLSR method constitutes part of a closed-loop path within the same ring. Even when another bypass route passing through different rings exists in the network, the conventional method does not serve to effectively use the protection channels of such another bypass route. It is difficult for the conventional method to avoid the cut-off of the transmission when a multiple failure occurs in the ring to which the node apparatus itself pertains.

Moreover, regardless of how many working channels on a failure-detected line are currently used, all the PCA circuits of the ring network in an opposite direction will be deactivated after the detection of the failure. The conventional method has a problem in that, even when only one working channel is used on the line where the failure is detected, all the PCA circuits of the ring in the opposite direction will be deactivated due to the failure.

SUMMARY OF THE INVENTION

An object of the present invention is to provide an improved ring switching method and apparatus in which the above-described problems are eliminated.

Another object of the present invention is to provide a ring switching method that can determine, at the time of detection of a failure, a bypass route among virtual ring routes suited to the network configuration, in order to compensate for the transmission over the ring network, and can lower the ratio of the protection channels to the working channels.

Another object of the present invention is to provide a node apparatus that that can determine, at the time of detection of a failure, a bypass route among virtual ring routes suited to the network configuration, in order to compensate for the transmission over the ring network, and can lower the ratio of the protection channels to the working channels.

The above-mentioned objects of the present invention are achieved by a ring switching method for a ring network in which a plurality of nodes are arranged in a multi-ring formation, the ring switching method comprising the steps of: providing each node with a routing table that defines relationships between a receiving physical line identifier with port number and a sending physical line identifier with port number for virtual ring bypass routes, said relationships being individually provided for respective transmission lines connected to the node; detecting, at a time of detection of a failure, each of the relationships from the routing table to determine a transmission line to which a switching request is sent; and performing a switching operation at a destination node where the switching request is received.

The above-mentioned objects of the present invention are achieved by a node apparatus for a ring network in which a plurality of nodes are arranged in a multi-ring formation, the node apparatus comprising: a routing table which defines relationships between a receiving physical line identifier with port number and a sending physical line identifier with port number for virtual ring bypass routes, the relationships being individually provided for respective transmission lines connected to the node apparatus; and a detection unit which detects, at a time of detection of a failure, each of the relationships from the routing table to determine a transmission line to which a switching request is sent, the detection unit detecting, at a time of relaying, each of the relationships from the routing table to determine a transmission line to which one of a switching request and a switching response is sent, and the detection unit detecting, at a time of receiving of a switching response, each of the relationships from the routing table to determine a transmission line to which the switching response is sent.

According to the ring switching method and node apparatus of the present invention, it is possible to determine a bypass route among virtual ring bypass routes suited to the network configuration, in order to compensate for the transmission over the network at the time of detection of a failure. It is possible for the present invention to lower the ratio of the protection channels to the working channels. Further, according to the ring switching method and node apparatus of the present invention, it is possible to avoid the deactivation of all the PCA circuits of the ring network in the opposite direction at the time of detection of a failure.

BRIEF DESCRIPTION OF THE DRAWINGS

Other objects, features and advantages of the present invention will become apparent from the following detailed description when read in conjunction with the accompanying drawings.

FIG. 7 is a flowchart for explaining a switching request sending procedure performed at the time of detection of a failure.

FIG. 9 is a diagram for explaining the configuration of an LAP-D frame.

FIG. 10 is a diagram for explaining the configuration of a switching frame according to the ring switching method of the present invention.

DETAILED DESCRIPTION OF PREFERRED EMBODIMENTS

A description will now be given of preferred embodiments of the present invention with reference to the accompanying drawings.

Figure 1:
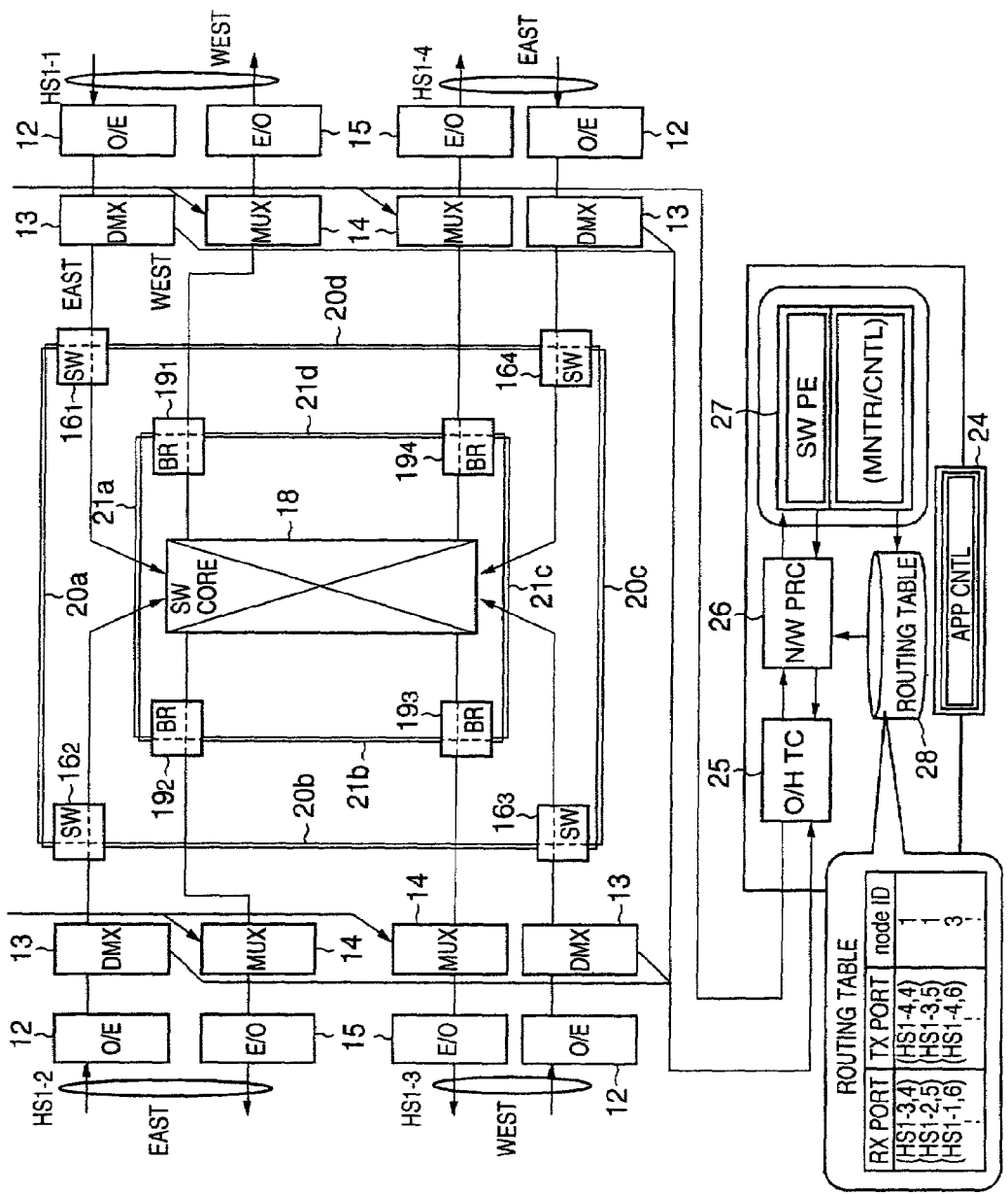
FIG. 1 is a block diagram of one embodiment of the node apparatus in which the ring switching method of the present invention is incorporated for use in a ring network.

FIG. 1 shows one embodiment of the node apparatus in which the ring switching method of the present invention is incorporated for use in a ring network.

As shown in FIG. 1, with respect to each of transmission lines HS 1-1, HS 1-2, HS 1-3 and HS 1-4, the node apparatus of the present embodiment includes an opto-electrical conversion circuit (O/E) 12, a demultiplexer (DMX) 13, a multiplexer (MUX) 14, and an electro-optical conversion circuit (E/O) 15. The opto-electrical conversion circuit 12 receives an incoming optical signal from the related transmission line, and provides opto-electrical conversion of the received signal to generate an electric signal. The demultiplexer 13 separates the multiplexed signal sent by the O/E 12, into electrical signals. The multiplexer 14 provides multiplexing of transmitting signals. The electro-optical conversion circuit 15 provides electro-optical conversion of the multiplexed transmitting signal sent by the multiplexer 14, to generate an outgoing optical signal that is transmitted to a corresponding one of the transmission lines.

In the node apparatus of the present embodiment, a plurality of switch circuits (SW) $16_1$ through $16_4$, a switch core unit (SW CORE) 18 and a plurality of bridge circuits (BR) $19_1$ through $19_4$ are provided. Moreover, wires 20a through 20d are respectively provided between two of the switch circuits $16_1$ through $16_4$, and wires 21a through 21d are respectively provided between two of the bridge circuits $19_1$ through $19_4$. The configuration of these wires is used in the present embodiment in order to enable the switching from the working channel to the protection channel or vice versa of any of the transmission lines in a multi-ring network. For example, in a conventional node apparatus, only the wires 20a and 20c (or the wires 20b and 20d) and the wires 21a and 21c (or the wires 21b and 21d) are provided, and the switching from the working channel to the protection channel of any transmission line is performed in a fixed manner.

The signals output by the demultiplexing units 13 of the respective transmission lines are supplied to the switch core unit 18 through the switch circuits $16_1$–$16_4$. The switch core part 18 performs cross-connecting of the received signals. The signals output by the switch core part 18 are supplied to the multiplexing units 14 of the respective transmission lines through the bridge circuits $19_1$ through $19_4$.

Further, in the node apparatus of the present embodiment, an apparatus control part (APP CNTL) 24 performs monitoring and control of the entire node apparatus. The apparatus control part 24 generally includes a switching overhead terminating circuit (O/H TC) 25, a network processor (N/W PRC) 26, a switching protocol engine unit (SW PE) 27 and a routing table 28. The switching overhead terminating circuit 25 terminates a control signal (the overhead) included in the optical signal (the switching frame) that is received from each transmission line. The network processor 26 performs switching of the transmission lines based on the control signal detected by the terminating circuit 25, and it is arranged between the terminating circuit 25 and the switching protocol engine unit 27. The switching protocol engine unit 27 performs switch processing based on the contents of the routing table 28 when a failure in a ring network is detected.

In the present embodiment, the routing table 28 is provided in which the relationships between a receiving physical line identifier (RX PORT) with its port number and a sending physical line identifier (TX PORT) with its port number are defined for virtual ring bypass routes, the relationships being individually provided for the respective transmission lines connected to the node apparatus. The switching protocol engine unit 27 performs the switch processing based on the contents of the routing table 28, and the node apparatus of the present embodiment attains improvement in the speed of routing of the switching overhead.

Further, in the routing table 28, the node identifier (node ID) of the node apparatus itself with respect to the related virtual ring bypass route is defined for each of the relationships. Each virtual ring bypass route of the routing table 28 in the present embodiment involves two or more rings in the multi-ring network, and it is possible to provide flexibility of the determination of a bypass route for recovery of the transmission over the network against a failure.

Figure 2:
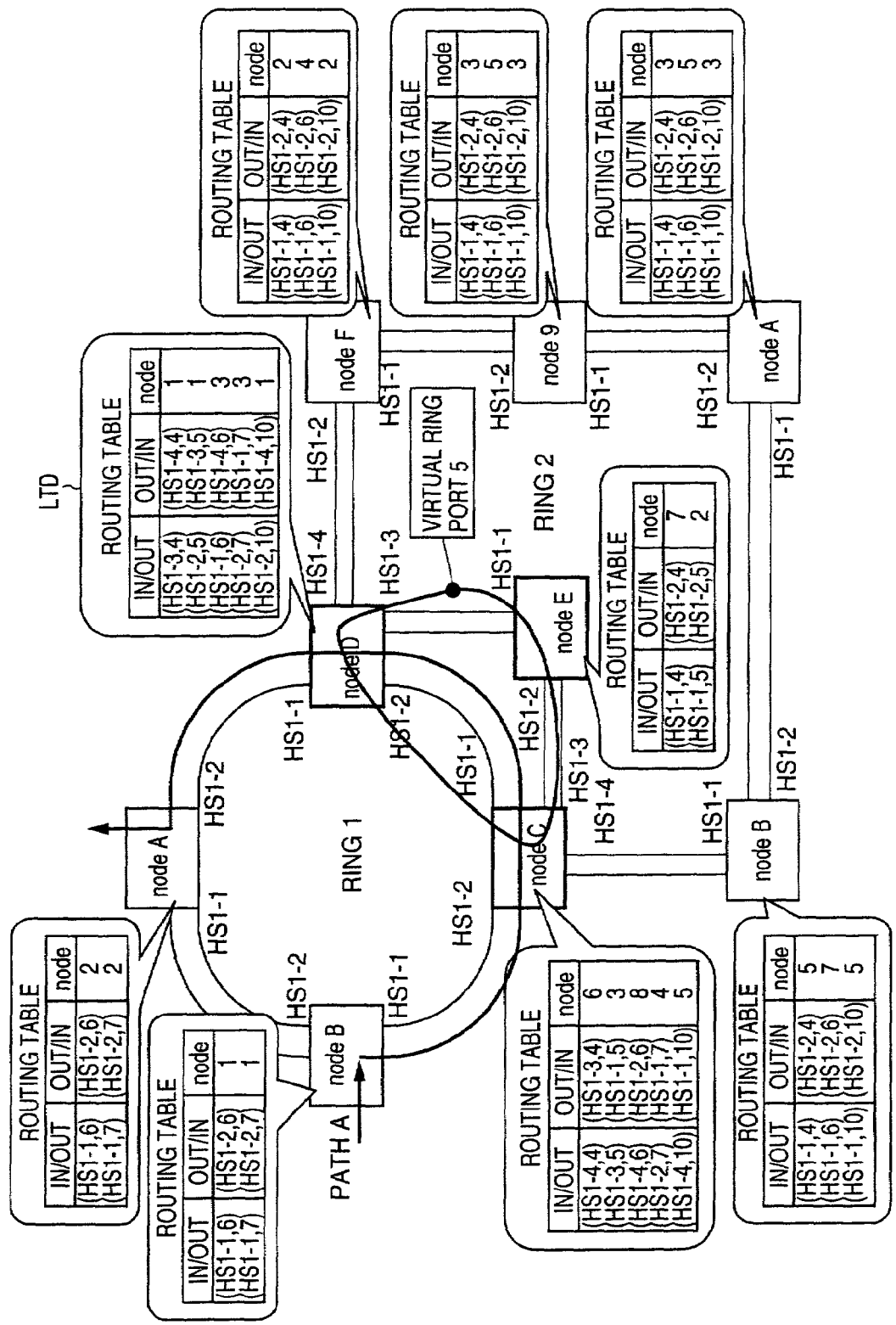
FIG. 2 is a diagram of a two-ring network in which two coupling nodes are provided in the boundary between the two rings.

FIG. 2 shows a two-ring network in which two coupling nodes C and D are provided in the boundary between the two rings. In the network in FIG. 2, a plurality of nodes are arranged in a multi-ring formation, and the coupling nodes C and D are located in the boundary between the As shown in FIG. 2, suppose that the path A is provided in the multi-ring network wherein a transmitting frame is added from node B (the starting point of the path A), the frame being transmitted through node C and node D, and it is dropped to node A (the end point of the path A). Moreover, suppose that the node apparatus at each of the plurality of nodes in the network is provided with the routing table 28. In the routing table 28, the relationships between a receiving physical line identifier (RX) with port number and a sending physical line identifier (TX) with port number are defined for virtual ring bypass routes, the relationships being individually provided for the respective transmission lines connected to the node apparatus. Further, in the routing table 28, the node identifier (node ID) of the node apparatus itself with respect to the related virtual ring bypass route is defined for each of the relationships.

Route reference of a failure switching is performed based on the routing table 28, and the determination of two or more protection channel routes that is taken into consideration at the time of detection of a multiple failure is performed, and the determination of the common bypass route for lowering the ratio of the protection channels to the working channels is also performed.

In the example of FIG. 2, the 1st line of the routing table "LTd" of node D describes that the relationship between the receiving line ID and the port number (HS1-3, 4) and the sending line ID and the port number (HS1-4, 4) is correlated to the node ID (1) which is assigned to the node D of the node apparatus itself with respect to the virtual ring consisting of nodes C, D and E. The 2nd line of the routing table "LTd" of node D describes that the relationship between the receiving line ID and the port number (HS1-2, 5) and the sending line ID and the port number (HS1-3, 5) is correlated to the node ID (1) which is also assigned to the node D of the node apparatus itself with respect to the virtual ring consisting of nodes C, D and E.

Figure 3:
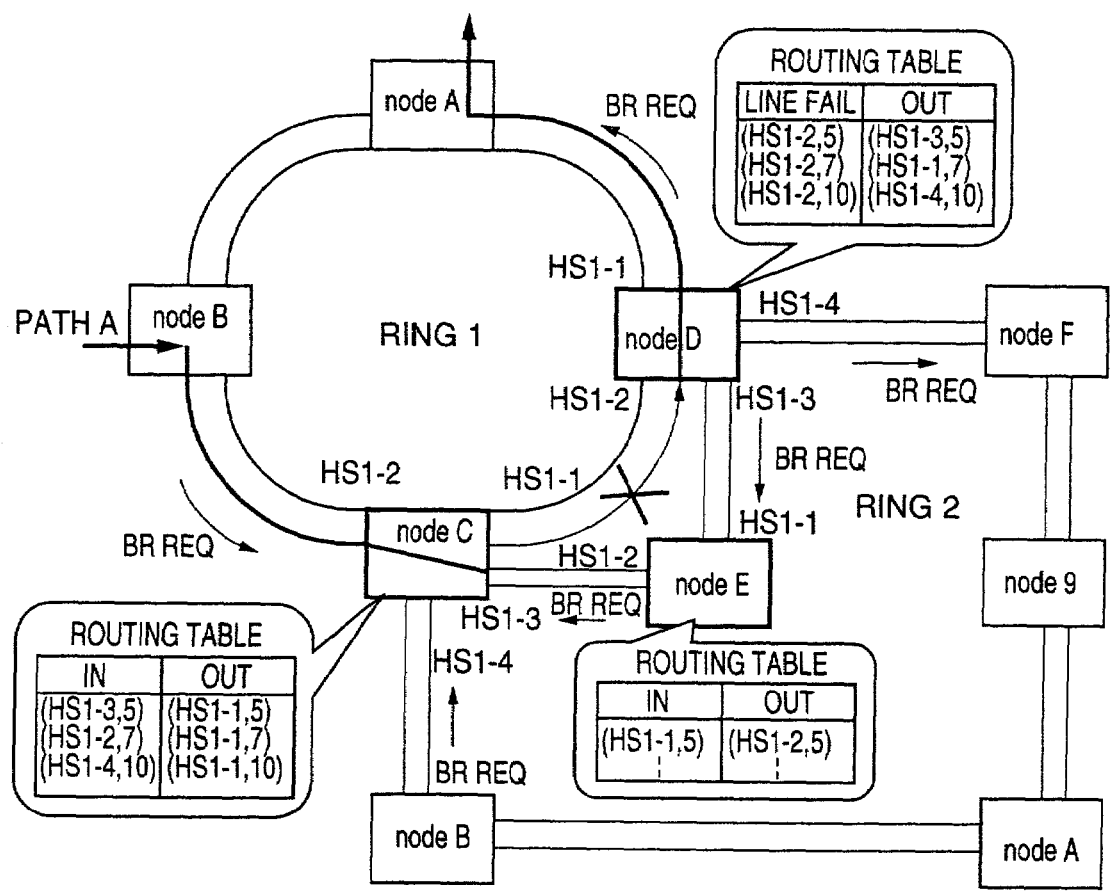
FIG. 3 is a diagram for explaining a switching procedure according to the ring switching method of the present invention which is performed at the time of detection of a line failure.
Figure 4:
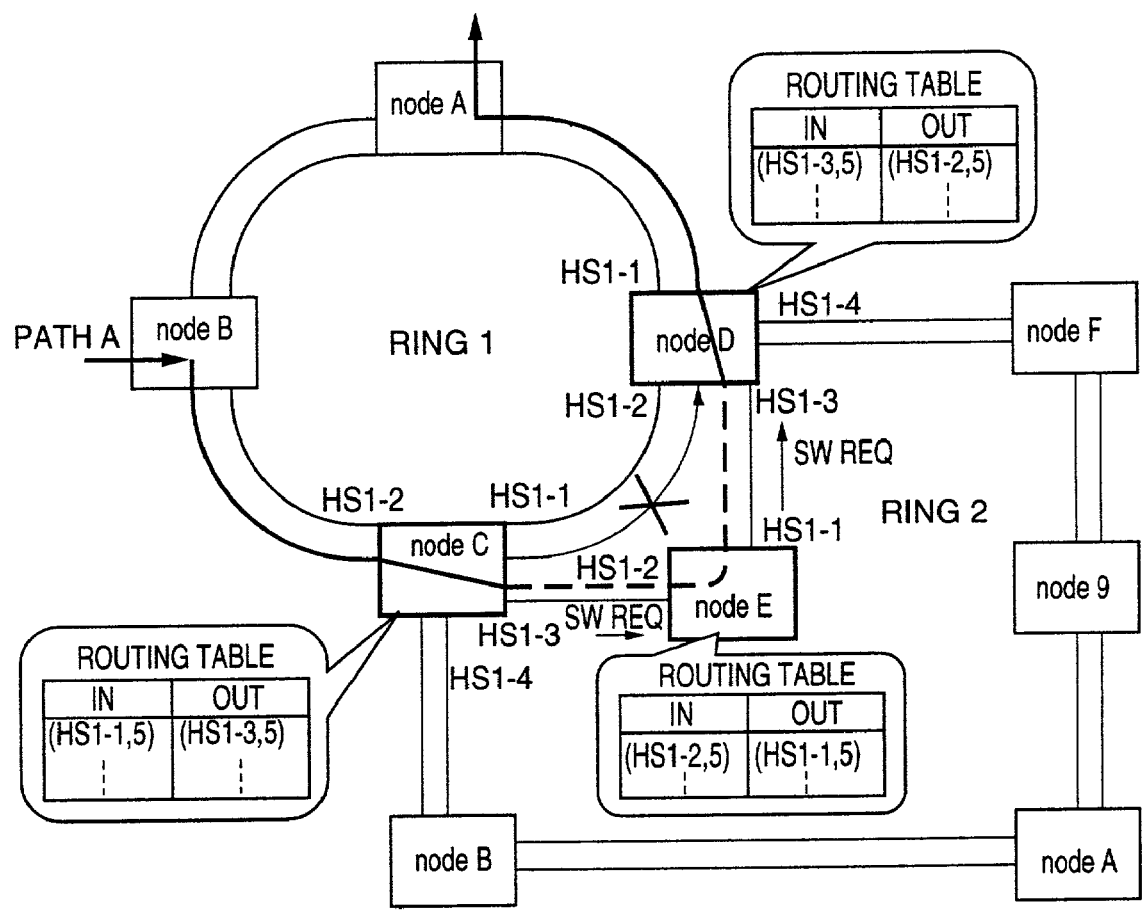
FIG. 4 is a diagram for explaining a switching procedure according to the ring switching method of the present invention which is performed at the time of detection of a line failure.

FIG. 3 and FIG. 4 are diagrams for explaining a switching procedure according to the ring switching method of the present invention which is performed at the time of detection of a line failure. Suppose that a line failure takes places in the transmission line between node C and node D within a ring network RING 1 consisting of nodes A, B, C and D.

As shown in FIG. 3, the node apparatus of node D detects a line failure in the transmission line between the nodes C and D, and retrieves the routing table of the node apparatus itself for the determination of a bypass route within the network. Regarding the determination of a bypass route, a description of a switching request sending procedure will be given later with reference to FIG. 7.

In the example of FIG. 3, at the time of detection of the line failure, the node apparatus of node D detects three protection-channel bypass routes based on the contents of the routing table of node D of the node apparatus itself, and these bypass routes link node D to node C (which is a far-end node of the network). In the routing table, each of the relationships corresponding to the three bypass routes includes the receiving line ID: HS1-2, which indicates the failing transmission lines from node C to node D. Then, the node apparatus of node D transmits a bridge switching request (BR REQ) SF/idle to each of the three transmission lines (next hop) indicated by the sending line ID and the port number of each relationship. Specifically, the node apparatus of node D transmits the bridge switching request to each of node E, node A and node F.

If the node apparatus at each node in the respective bypass routes recognizes that the switching request received at the node apparatus is not addressed to the node of the node apparatus itself, the node apparatus detects the sending line ID and the port number of the routing table from the receiving line ID and the port number, contained in the received switching request, in order to determine a destination line to which the switching request is sent. Then, the node apparatus transmits the switching request to the next node through the destination line.

In the example of FIG. 3, the node apparatus of node C is a destination of the bridge switching request sent by the node apparatus of node D. After the bridge switching request is received, the node apparatus of node C recognizes that the request is addressed to the node of the node apparatus itself. Then, the node apparatus of node C delivers a control signal to the switching protocol engine 27, and the switching protocol engine 27 performs a switching request receiving procedure with the first-arrival priority (in FIFO manner), which will be described later with reference to FIG. 8A and FIG. 8B.

In FIG. 3, it is assumed that the switching request sent from node D has reached node C at the earliest time when it is sent through the bypass route passing thorough the node E. The node apparatus of node C chooses the transmission line HS1-3 as a bridge of the transmission line HS1-1, and, in order to send a switching response to the node apparatus of node D, the node apparatus of node C sends the switching response to node E via the transmission line HS1-3. The bypass route recognized at this time is shown in FIG. 4.

In FIG. 4, the node apparatus of node C sends a switching request (SW REQ) SF/bridge to node D via node E. The node apparatus of node E, which is a relay node of the switching request, detects the label of this switching request signal and transmits the switching request to node D. The switching request includes a bridge status. The node apparatus of node E connects the PCA (protective connecting arrangement) circuit of the node apparatus itself to a request-received line from a request destination line, and switching is performed to send the switching request to the next node D. Failure information AIS-P is inserted in the connected PCA circuit at this time. The node apparatus of node D receives the switching request from the transmission line indicated by the receiving line ID and the port number (HS1-3, 5), and performs switch processing if a time count of a switching timer does not exceed a predetermined period.

Figure 5:
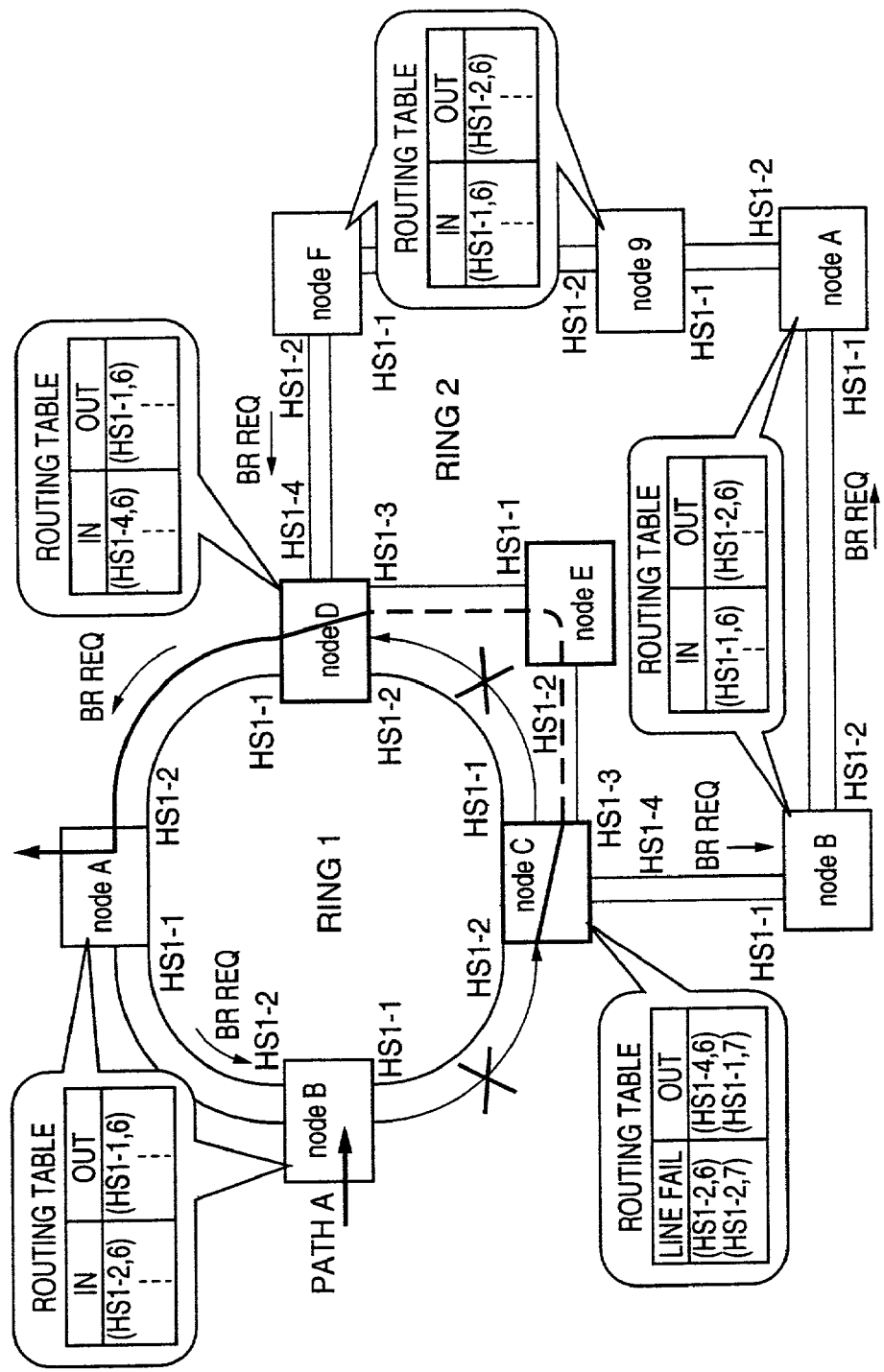
FIG. 5 is a diagram for explaining a switching route selection procedure according to the ring switching method of the present invention which is performed at the time of detection of a multiple failure.
Figure 6:
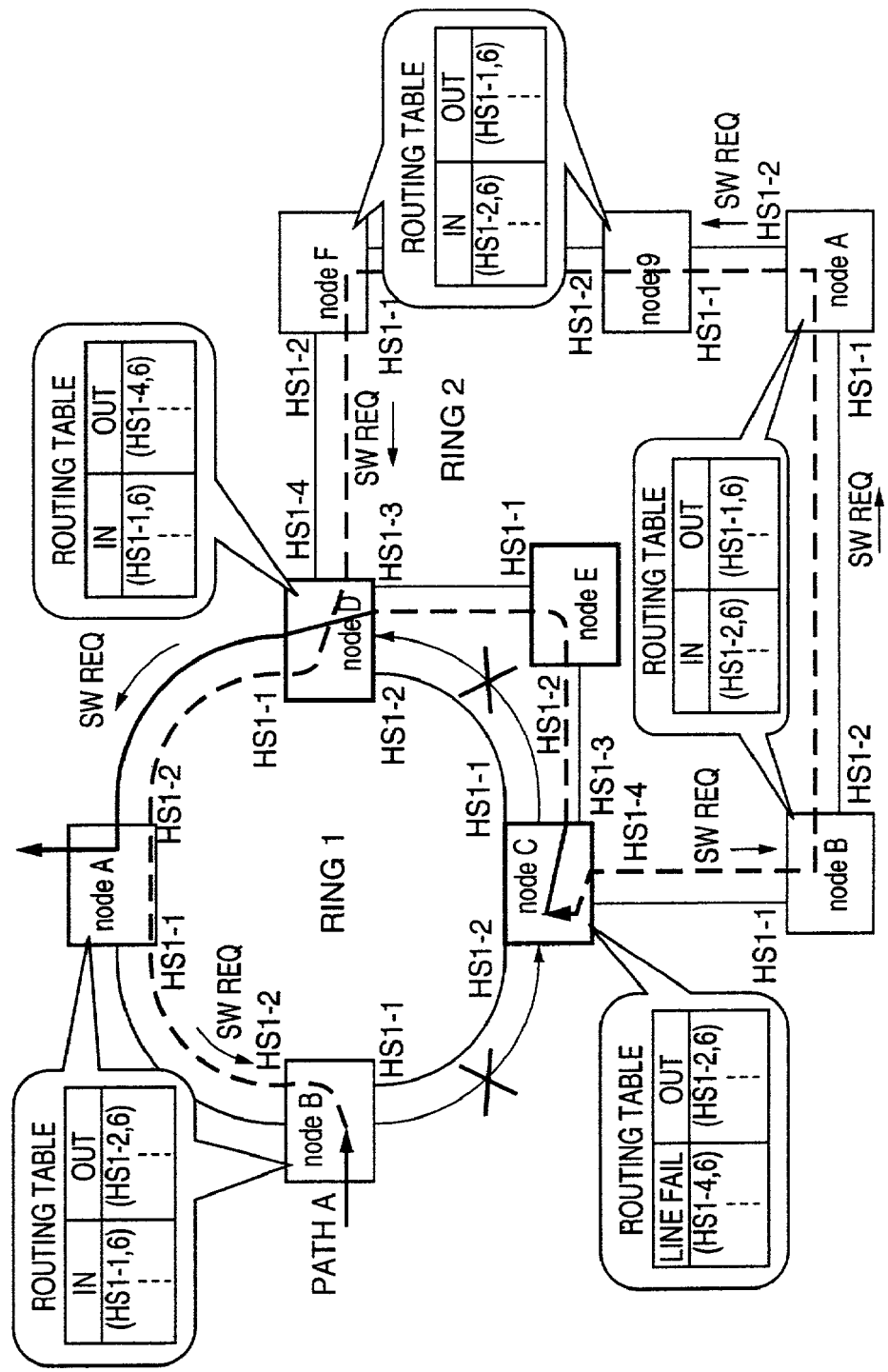
FIG. 6 is a diagram for explaining a switching route selection procedure according to the ring switching method of the present invention which is performed at the time of detection of a multiple failure.

FIG. 5 and FIG. 6 show a switching route selection procedure according to the ring switching method of the present invention which is performed by the node apparatus at the time of detection of a multiple failure.

As shown in FIG. 5, in addition to the single failure condition in FIG. 4, a line failure takes place in the transmission line between node B and node C. The node apparatus of node C detects a line failure in the transmission line between the nodes B and C, and retrieves the routing table of the node apparatus itself for the determination of a bypass route within the network.

In the example of FIG. 5, at the time of detection of the line failure, the node apparatus of node C detects two protection-channel bypass routes based on the contents of the routing table of node C of the node apparatus itself, and these bypass routes link node C to node B (which is a far-end node of the network). In the routing table, each of the relationships corresponding to the two bypass routes includes the receiving line ID: HS1-2, which indicates the failing transmission line from node C to node B. However, the node apparatus of node C already uses the transmission line HS1-1 at the port number 7 for a failure recovery line. Then, the node apparatus of node C transmits a bridge switching request (BR REQ) SF/idle to only the transmission line HS1-4 at the port number 6.

If the node apparatus at each node in the bypass route recognizes that the switching request received at the node apparatus is not addressed to the node of the node apparatus itself, the node apparatus detects the sending line ID and the port number of the routing table from the receiving line ID and the port number, contained in the received switching request, in order to determine a destination line to which the switching request is sent. Then, the node apparatus transmits the switching request to the next node through the destination line.

In the example of FIG. 5, the node apparatus of node B is a destination of the bridge switching request sent by the node apparatus of node C. After the bridge switching request is received, the node apparatus of node B recognizes that the request is addressed to the node of the node apparatus itself. Then, the node apparatus of node B delivers a control signal to the switching protocol engine 27, and the switching protocol engine 27 performs a switching request receiving procedure (for example, bridge processing) with the first-arrival priority in an FIFO manner, which will be described later with FIGS. 8A and 8B.

In FIG. 5, it is assumed that the node apparatus of node B chooses the transmission line HS1-2 as a bridge of the transmission line HS1-1, and, in order to send a switching response to the node apparatus of node C, the node apparatus of node B sends the switching response to node A through the transmission line HS1-2 and the switching response is addressed to node C. The bypass route recognized at this time is indicated by the dotted line in FIG. 6.

In FIG. 6, the node apparatus of node B sends a switching response SF/bridge to node C via nodes A–B. For example, the node apparatus of node A, which is a relay node of the switching response, detects the label of the switching response signal and transmits the switching response to node D (next step). The switching response includes a bridge status. The node apparatus of node A connects the PCA (protective connecting arrangement) circuit of the node apparatus itself to a response-received line from a response destination line, and switching is performed to send the switching response to the next node D. Failure information AIS-P is inserted in the connected PCA circuit at this time. The node apparatus of node C receives the switching response from the transmission line indicated by the receiving line ID and the port number (HS1-4, 6) of the routing table thereof, and performs switch processing if a time count of a switching timer does not exceed a predetermined period.

FIG. 7 shows a switching request sending procedure which is performed by the switching protocol engine 27 of the node apparatus of the present embodiment at a failure-detected node of a ring network. Hereinafter, the switching protocol engine 27 is called the processor, for the sake of convenience of description.

As shown in FIG. 7, the processor at step S10 causes the user to set up a user-defined routing table 28. As a result of the step S10, in the node apparatus, the routing table 28 is provided wherein the relationships between a receiving physical line identifier (RX) with port number and a sending physical line identifier (TX) with port number are defined for virtual ring bypass routes (the user definition), the relationships being individually provided for the respective transmission lines connected to the node apparatus. Further, in the routing table 28, the node identifier (node ID) of the node apparatus itself with respect to the related virtual ring bypass route is defined for each of the relationships. The processor at step S12 determines whether a line failure in any of the transmission lines connected to the node apparatus is detected. When the result at the step S12 is affirmative (a line failure is detected), the control of the processor is transferred to step S14. Otherwise the control of the processor is transferred to the step S12.

The processor at step S14 determines whether multicasting of a switching request from the node apparatus to all the transmission lines of the bypass routes is complete. When the result at the step S14 is negative (the multicasting is incomplete), the processor at step S16 detects a destination line (next hop) from the routing table 28. In the step S16, the processor reads out the sending line identifier and the port number of each of the virtual ring bypass routes from the routing table 28 to determine a transmission line to which the switching request is sent.

After the step S16 is performed, the processor at step S18 determines whether the PCA (protective connecting arrangement) circuits of the destination line are already used. When the result at the step S18 is affirmative (already used), the control of the processor is transferred to the step S14. When the result at the step S18 is negative (not yet used), the control of the processor is transferred to a following step S20. The processor at step S20 performs the transmission of the switching request to the destination line by using the PCA circuit thereof.

On the other hand, when the result at the step S14 is affirmative (the multicasting is complete), the control of the processor is transferred to step S22. In the step S22, the processor is set in a waiting state, and the arrival of a switching response is awaited. Then, the switching sending procedure of FIG. 7 ends.

Figure 8A:
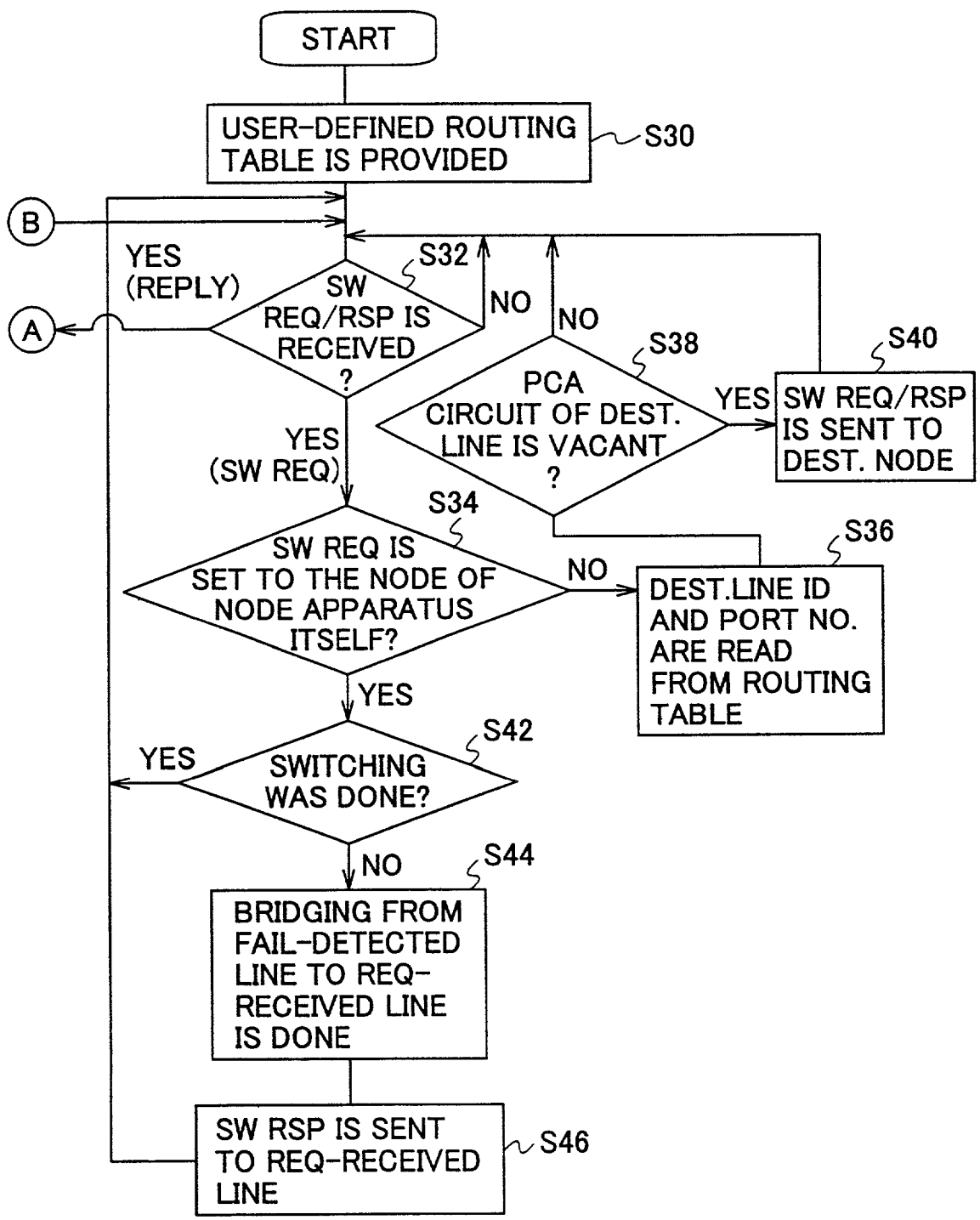
FIG. 8A and FIG. 8B are a flowchart for explaining a switching request receiving procedure performed at each node of a ring network.
Figure 8B:
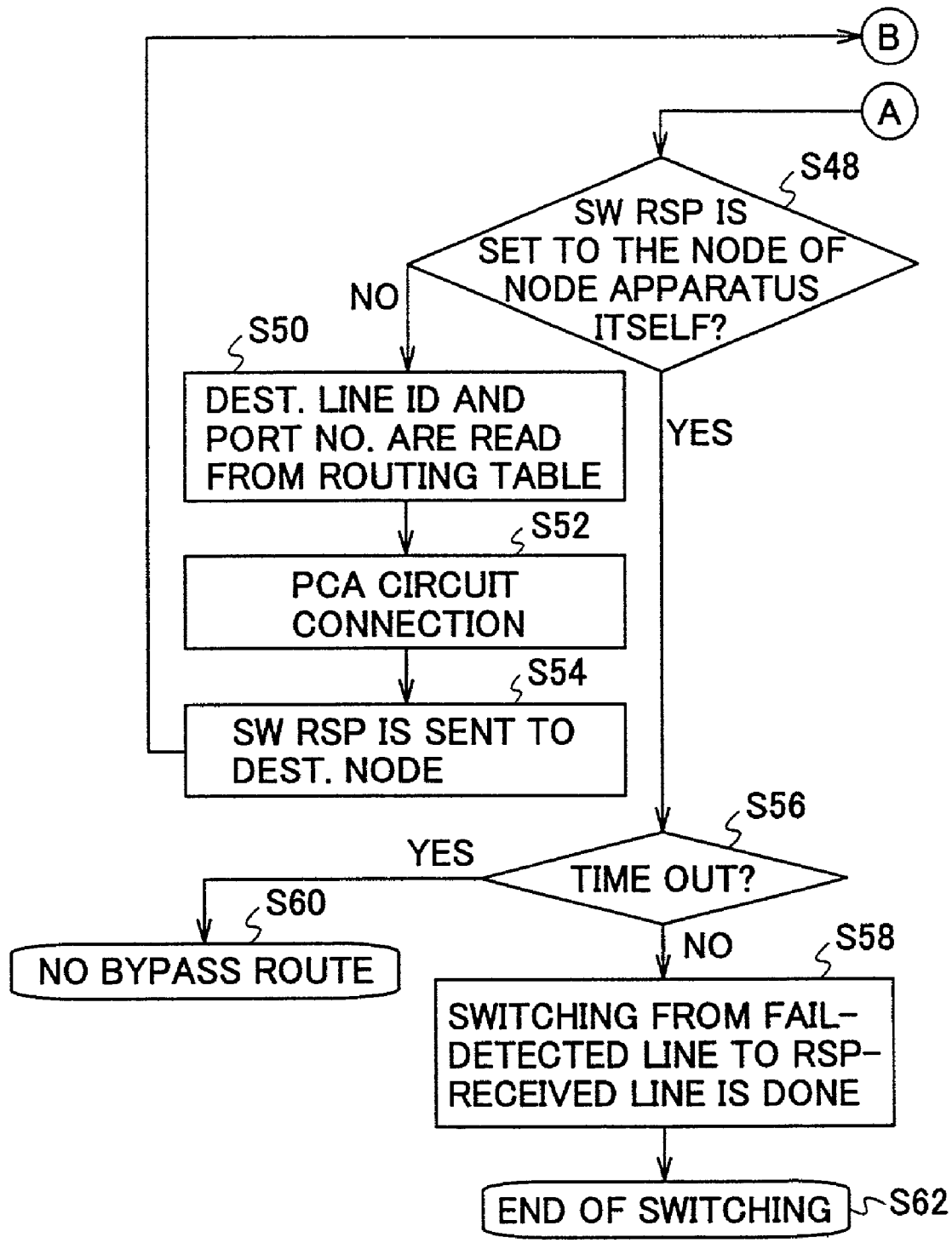

FIG. 8A and FIG. 8B show a switching request receiving procedure performed by the switching protocol engine 27 of the node apparatus of the present embodiment at each node of a ring network. Hereinafter, the switching protocol engine 27 is called the processor, for the sake of convenience of description.

As shown in FIG. 8A, the processor at step S30 causes the user to set up a user-defined routing table 28 for the node apparatus at each node in the same manner as at the step S10 of FIG. 7. The processor at step S32 determines whether a switching request or a switching response is received. When the switching request is determined as being received at the step S32, the processor at step S34 determines whether the switching request is addressed to the node of the node apparatus itself.

When the result at the step S34 is negative (it is not addressed to the node), the processor at step S36 detects a destination line based on the contents of the routing table 28. In the step S36, the processor reads out the sending line identifier and the port number of each of the virtual ring bypass routes from the routing table 28 to determine a transmission line to which the switching request is sent. After the step S36 is performed, the processor at step S38 determines whether the PCA circuit of the destination line is vacant. When the PCA circuit is not vacant, the control of the processor is transferred to the step S32. When the PCA circuit is vacant, the processor at step S40 performs the transmission of the switching request to the destination line using the PCA circuit thereof. After the step S40 is performed, the control of the processor is transferred to the step S32.

On the other hand, when the switching request is addressed to the node at the step S34, the processor at step S42 determines whether the switching was done by a preceding switching request. When the result at the step S42 is affirmative, the control of the processor is transferred to the step S32. When the result at the step S42 is negative, the processor at step S44 performs bridging operation in a first-in/first-out manner so as to change the failure-detected line to the switching-request reception line. After the step S44 is performed, the processor at step S46 performs the transmission of a switching response to the switching-request reception line. After the step S46 is performed, the control of the processor is transferred to the step S32.

As indicated by the arrow A in FIG. 8A, when it is determined at the step S32 that a switching response is received, the control of the processor is transferred to step S48. As shown in FIG. 8B, the processor at step S48 determines whether the switching response is addressed to the node of the node apparatus itself. When the result at the step S48 is negative (it is not addressed to the node), the processor at step S50 detects a destination line based on the contents of the routing table 28. In the step S50, based on the receiving line identifier and the port number of a response-received line, the processor reads out the sending line identifier and the port number of each of the virtual ring bypass routes from the routing table 28 to determine a destination line to which the switching response is sent. After the step S50 is performed, the processor at step S52 establishes a connection between the response-received line and the destination line by using the PCA circuit of the destination line. After the step S52 is performed, the processor at step S54 performs the transmission of the switching response to the destination line. After the step S54 is performed, the control of the processor is transferred to the step S32 as indicated by the arrow B in FIG. 8B.

On the other hand, when the result at the step S48 is affirmative (the switching response is addressed to the node), the processor at step S56 determines whether a time count of a switching timer exceeds a predetermined period (time out). When the time count exceeds the predetermined period, it is determined that there is no bypass route. The processor at step S60 sends an error message indicating that there is no bypass route, and terminates the processing. When the time count does not exceed the predetermined period, the processor at step S58 performs switch processing to change the failure-detected line to the response-received line. The processor at step S62 sends a completion message indicating that the switching is done, and terminates the processing. In addition, the switching timer starts measurement of the lapsed time (the time count) after the time the switching request is transmitted. If the time count (the elapsed time) of the switching timer exceeds the predetermined time, such as several 10 msec, it is determined that a time-out event occurs and there is no bypass route.

FIG. 9 shows the configuration of an LAP-D frame. FIG. 10 shows the configuration of a switching frame according to the ring switching method of the present invention.

In the ring switching method and node apparatus of the present embodiment, the data communications channels (DCC; D4–D12) contained within the line overhead (which is called the switching frame) are used as a communication means to send and receive a switching request or switching response. In practical applications, the above-mentioned DCC overhead is shared with the LAP-D (Link Access Procedure for the D channel) frame shown in FIG. 9. As the common means, the HDLC (High-level Data Link Control) frame is used. When the switching frame is received from another node, it is judged at the node apparatus that the test bits (called the non-station address bits) within the address portion (ADDR) of the switching frame are set to "00000000" as shown in FIG. 10. This allows the switching frame to distinguish from the LAP-D frame, and the ring switching method and the node apparatus of the present embodiment enables the protocol allocation processing at the driver level.

In the switching frame of FIG. 10, the switching type (SW TYPE) is provided at the front-end two bits of the control portion (16 bits) of the frame overhead. As the switching type, there are provided four types of frames: a restoration request frame (00); a bridge request frame (01); a switch request frame (10) and a wait-to-restore request frame (11). The node ID of a destination node is provided at the following six bits of the control portion of the frame overhead. The port number which is used in the routing table 28 is provided as the following 8 bits of the frame overhead.

Figure 11:
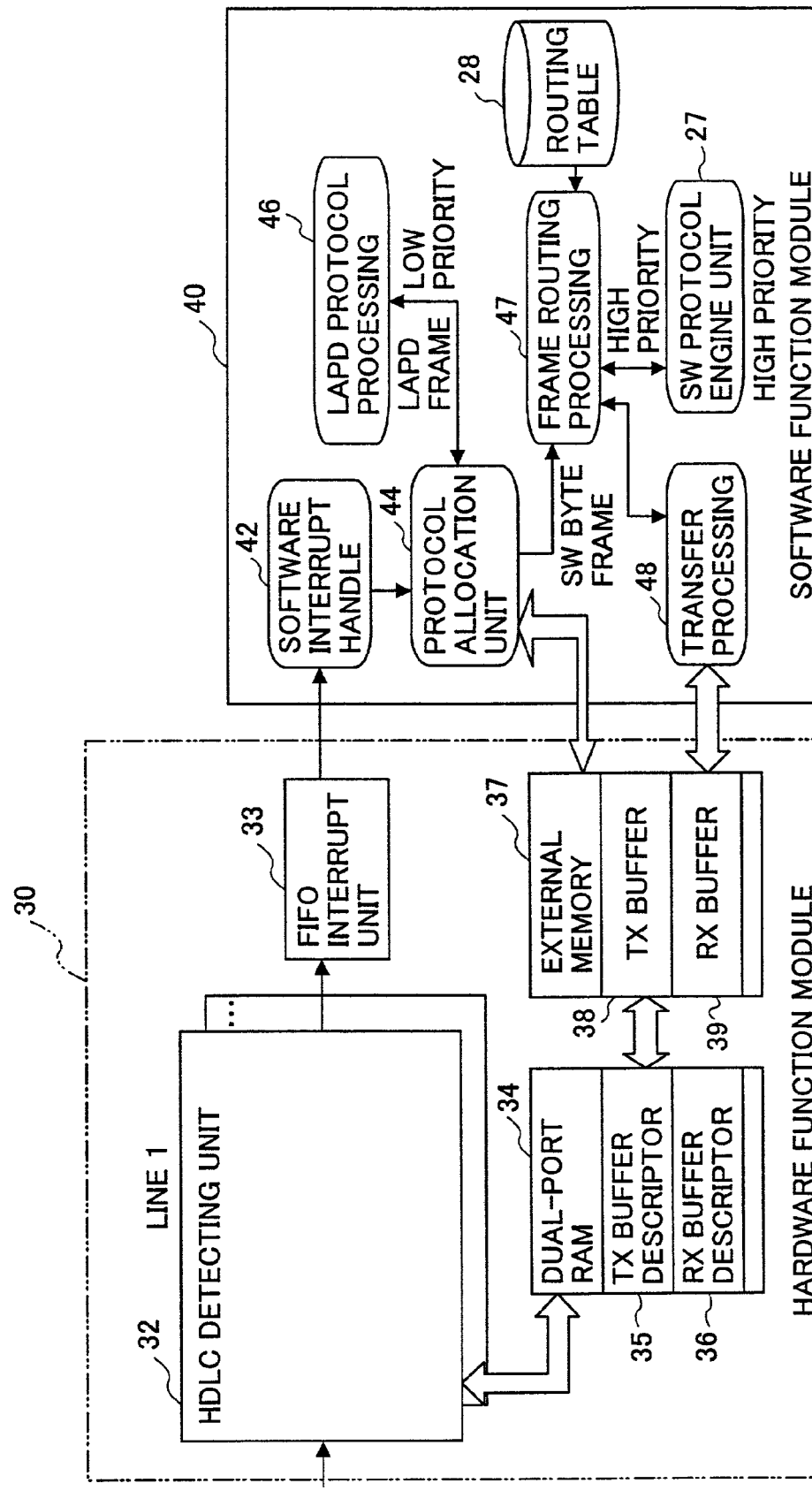
FIG. 11 is a block diagram of a hardware function module and a software function module in which the digital communications channel contained within the line overhead is used as a communication means for sending and receiving a switching request.

FIG. 11 shows a hardware function module and a software function module in which the digital communications channels (DCC; D4–D12) contained within the line overhead are used as a communication means for sending and receiving a switching request.

As shown in FIG. 11, the hardware function module 30 (which corresponds to the overhead terminating circuit 25 in FIG. 1) performs the HDLC termination after the termination of the SONET frame. In the hardware function module 30, a HDLC detection part 32 is provided for each of the transmission lines connected to the node apparatus. When the HDLC is detected at the time of the frame reception, the HDLC detection part 32 generates an interrupt signal, and this interrupt signal is stored in an FIFO (first-in/first-out) interrupt queue 33 and sent to the software function module 40.

Further, in the hardware function module 30, a dual-port RAM 34 (connected to the HDLC detection part 32) is provided, and a transmitting buffer descriptor 35 and a receiving buffer descriptor 36 are stored in the RAM 34. Moreover, an external memory 37, a transmitting buffer 38 and a receiving buffer 39 are provided.

In the software function module 40, a software interrupt handler 42 starts operation of a protocol allocation unit 44 by the interrupt signal generated at the reception of the HDLC frame. The protocol allocation unit 44 determines whether the received HDLC frame is a LAP-D frame or a switching frame for the switching request transmission. In the case of the switching frame, the non-station address "00000000" is allocated to the address part of the HDLC frame.

When it is determined as being a LAP-D frame, the protocol allocation unit 44 sends a message to a LAP-D protocol processing part 46, and terminates the interrupt processing. A low priority level is set to the processing of the LAP-D protocol processing part 46 at this time. When it is determined as being a switching frame for the switching request transmission, the protocol allocation unit 44 sends out a message to a frame routing processing part 47, and terminates the interrupt processing. A high priority level is set to the processing of the frame routing processing part 47 at this time. The frame routing processing part 47 performs the switching request receiving procedure shown in FIG. 8A and FIG. 8B in cooperation with the switching protocol engine unit 27 and the routing table 28, after the message is received from the protocol allocation unit 44.

According to the ring switching method and node apparatus of the present embodiment, it is possible to determine a bypass route among virtual ring bypass routes suited to the network configuration, in order to compensate for the transmission over the network at the time of detection of a failure. It is possible for the present embodiment to lower the ratio of the protection channels to the working channels. Further, according to the ring switching method and node apparatus of the present embodiment, it is possible to avoid the deactivation of all the PCA circuits of the ring network in the opposite direction at the time of detection of a failure.

In the above-described embodiment, the routing table 28 is provided wherein the relationships between a receiving physical line identifier (RX) with port number and a sending physical line identifier (TX) with port number are defined for virtual ring bypass routes, the relationships being individually provided for the respective transmission lines connected to the node apparatus. Further, in the routing table 28, the node identifier (node ID) of the node apparatus itself with respect to the related virtual ring bypass route is defined for each of the relationships. Each virtual ring bypass route of the routing table in the present embodiment involves two or more rings in the multi-ring network, and it is possible to provide flexibility of the determination of a bypass route for recovery of the transmission over the network against a failure, including a multiple failure.

Moreover, by multicasting a switching request to two or more transmission lines, determined based on the contents of the routing table at the time of detection of a failure, the failure-detected node can be switched to any of the protection channels of two or more bypass routes, and the degree of redundancy of the determination of a bypass route can be increased.

Moreover, the shortest course can be chosen with a switching course in time by performing bridge processing of the first-arrival priority (first-in/first-out) at the time of reception of a switching request, turning up a switching request course, and considering as a response course.

Figure 12:
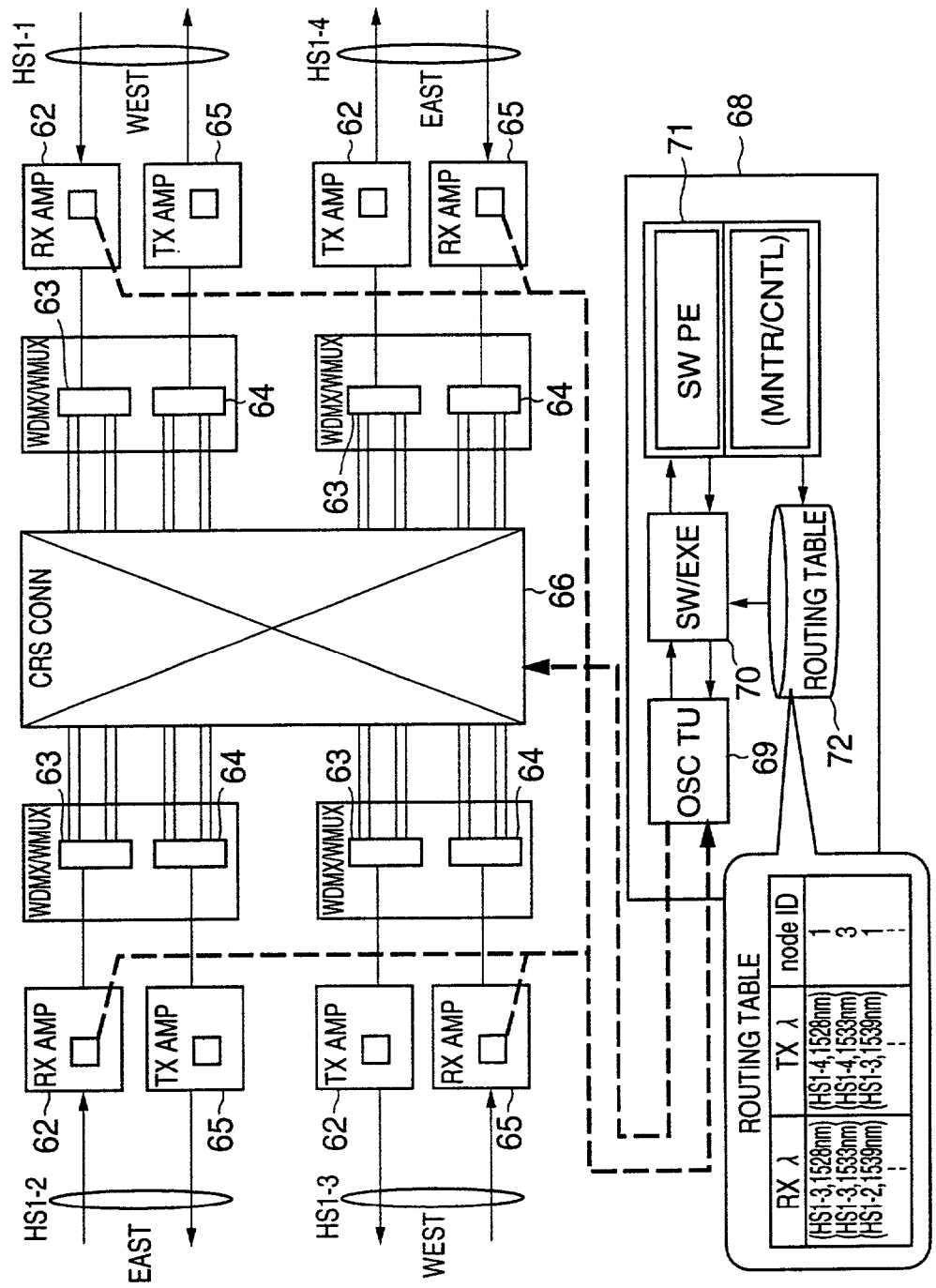
FIG. 12 is a block diagram of one embodiment of the node apparatus in which the ring switching method of the present invention is incorporated for use in a WDM ring network.

Furthermore, by changing virtual ring registration of the routing table, the present embodiment makes it possible to remove, from the switching protection route, the transmission line where the number of the working channels available is insufficient and the protection channels are used, FIG. 12 shows another embodiment of the node apparatus in which the ring switching method of the present invention is incorporated for use in a WDM (wavelength division multiplexing) network.

As shown in FIG. 12, with respect to each of transmission lines HS 1-1, HS 1-2, HS 1-3 and HS 1-4, the node apparatus of the present embodiment includes a receiving amplifier (RX AMP) 62, a wavelength demultiplexing unit (WDMX) 63, a wavelength multiplexing unit (WMUX) 64 and a transmitting amplifier (TX AMP) 65. The receiving amplifier 62 provides optical amplification of a received wavelength-multiplexed light. The demultiplexing unit 63 performs wavelength-demultiplexing of the received light amplified by the receiving amplifier 62, in order to separate the received light into optical signals with different wavelengths. The multiplexing unit 64 performs wavelength-multiplexing of the transmitting optical signals. The transmitting amplifier 65 provides optical amplification of the wavelength-multiplexed light output by the multiplexing unit 64.

The node apparatus of the present embodiment includes an optical cross-connecting unit (CRS CONN) 66. The optical signals output by the respective demultiplexing units 63 on the transmission lines are sent to the cross-connecting unit 66. The cross-connecting unit 66 performs bridge and switch operations related to transmission lines. The optical signals output by the cross-connecting unit 66 are sent to the respective multiplexing units 64 on the transmission lines.

In the node apparatus of the present embodiment, the cross-connecting unit 66 performs bridging and switching operations of the optical signals, and it is configured so as to allow the switching of one of the transmission lines, passing through different rings, from the working channel to the protection channel or vice versa.

Further, in the node apparatus of the present embodiment, an apparatus control part 68 performs monitoring and control of the entire node apparatus. The apparatus control part 68 generally includes a control signal terminating unit (OSC TU) 69, a switching execution unit (SW EXE) 70, a switching protocol engine unit (SW PE) 71 and a routing table 72. The control signal terminating unit 69 terminates a control signal included in the optical signal received from each transmission line. The switching execution unit 70 performs switching of the transmission lines based on the control signal detected by the terminating unit 69. The switching protocol engine unit 71 performs switching processing that is essentially the same as that of the switching protocol engine unit 27 in the previous embodiment.

In the present embodiment, the routing table 72 is provided in which the relationships between receiving physical line identifier (RX) with wavelength data ($\lambda$) and sending physical line identifier (TX) with wavelength data ($\lambda$) are defined for virtual ring bypass routes, the relationships being individually provided for the respective transmission lines connected to the node apparatus. Further, in the routing table, the node identifier (node ID) of the node apparatus itself with respect to the related virtual ring bypass route is defined for each of the relationships. Each virtual ring bypass route of the routing table in the present embodiment involves two or more rings in the multi-ring network, and it is possible to provide flexibility of the determination of a bypass route for recovery of the transmission over the network against a failure.

The switching protocol engine unit 71 performs switch processing based on the routing table 72. Specifically, the switching protocol engine unit 71 detects, at the time of detection of a failure, one of the relationships from the routing table 72 to determine a transmission line to which a switching request is sent. The switching protocol engine unit 71 detects, at the time of relaying of a switching request or response, one of the relationships from the routing table 72 to determine a transmission line to which the switching request or response is sent. The switching protocol engine unit 71 detects, at the time of receiving of a switching request, one of the relationships from the routing table 72 to determine a transmission line to which a switching response is sent back.

It is possible for the present embodiment to attain improvement in the speed of routing of the switching overhead. The ring switching method and node apparatus of the present embodiment employ the switching protocol which checks the empty state of a protection channel for every node. For this reason, it is suitable for the WDM ring network in which the vacant wavelength (path) is left as a protection channel.

In addition, the steps S16, S36 and S50 in the above-described embodiments correspond to the detection unit in the claims. The steps S14 and S20 in the above-described embodiments correspond to the multicasting unit in the claims. Moreover, the step S44 and the step S46 in the above-described embodiments correspond to the bridge processing unit and the switching response unit in the claims.

The present invention is not limited to the above-described embodiments, and variations and modifications may be made without departing from the scope of the present invention.

Further, the present invention is based on Japanese priority application No. 2001-288471, filed on Sep. 21, 2001, the entire contents of which are hereby incorporated by reference.

What is claimed is:

1. A ring switching method for a ring network in which a plurality of nodes are arranged in a multi-ring formation, comprising the steps of:

providing each node with a routing table that defines relationships between a receiving physical line identifier with port number and a sending physical line identifier with port number for virtual ring bypass routes, said relationships being individually provided for respective transmission lines connected to the node;

detecting, at a time of detection of a failure, each of the relationships from the routing table to determine a transmission line to which a switching request is sent; and performing a switching operation at a destination node where the switching request is received.

2. The ring switching method of claim 1, wherein the routing table is provided such that each of the relationships corresponds to a node identifier with respect to the related virtual ring bypass route.

3. A node apparatus for a ring network in which a plurality of nodes are arranged in a multi-ring formation, comprising:

a routing table defining relationships between a receiving physical line identifier with port number and a sending physical line identifier with port number for virtual ring bypass routes, said relationships being individually provided for respective transmission lines connected to the node apparatus; and a detection unit detecting, at a time of detection of a failure, each of the relationships from the routing table to determine a transmission line to which a switching request is sent, the detection unit detecting, at a time of relaying, each of the relationships from the routing table to determine a transmission line to which one of a switching request and a switching response is sent, and the detection unit detecting, at a time of receiving of a switching response, each of the relationships from the routing table to determine a transmission line to which the switching response is sent.

4. The node apparatus according to claim 3, wherein the routing table is provided such that each of the relationships corresponds to a node identifier of the node apparatus with respect to a virtual ring.

5. The node apparatus according to claim 4, further comprising a multicasting unit which transmits the switching request to two or more transmission lines by multicasting, the transmission lines being determined by the detection unit at the time of detection of the failure.

6. The node apparatus according to claim 4, further comprising:

a bridge processing unit performing bridge processing in a first-in/first-out manner at the time of reception of the switching request; and a switching response unit sending the switching response to the transmission line determined by the detection unit at the time of receiving of the switching request.

7. The node apparatus according to claim 3, wherein one of the switching request and the switching response is carried by a data communications channel contained within an overhead of a frame which is transmitted as a switching protocol.

8. A node apparatus for a wavelength-division-multiplexing ring network in which a plurality of nodes are arranged in a multi-ring formation, comprising:

a routing table defining relationships between a receiving physical line identifier with wavelength data and a sending physical line identifier with wavelength data for virtual ring bypass routes, the relationships being individually provided for respective transmission lines connected to the node apparatus; and a detection unit detecting, at a time of detection of a failure, each of the relationships from the routing table to determine a transmission line to which a switching request is sent, the detection unit detecting, at a time of relaying, each of the relationships from the routing table to determine a transmission line to which one of a switching request and a switching response is sent, and the detection unit detecting, at a time of receiving of a switching request, each of the relationships from the routing table to determine a transmission line to which a switching response is sent.

* * * * *